(12) United States Patent
Alahmar

(10) Patent No.: US 10,846,833 B2
(45) Date of Patent: Nov. 24, 2020

(54) SYSTEM AND METHOD FOR VISIBILITY ENHANCEMENT

(71) Applicant: SMR Patents S.à.r.l., Luxembourg (LU)

(72) Inventor: Ahed Alahmar, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 110 days.

(21) Appl. No.: 15/255,840

(22) Filed: Sep. 2, 2016

(65) Prior Publication Data
US 2017/0061593 A1 Mar. 2, 2017

(30) Foreign Application Priority Data
Sep. 2, 2015 (EP) ..................................... 15183520

(51) Int. Cl.
*G06T 5/00* (2006.01)
*G06K 9/00* (2006.01)
(Continued)

(52) U.S. Cl.
CPC .............. *G06T 5/008* (2013.01); *B60K 35/00* (2013.01); *B60R 1/00* (2013.01); *B62D 15/029* (2013.01);
(Continued)

(58) Field of Classification Search
CPC ............. B60R 1/00; B60R 2300/301; B60R 2300/307; B60R 2300/8066; G06T 5/008;
(Continued)

(56) References Cited

U.S. PATENT DOCUMENTS

| 2005/0086000 A1 | 4/2005 | Tsuchiya et al. |
| 2006/0125919 A1* | 6/2006 | Camilleri ................. B60R 1/00 348/148 |

(Continued)

FOREIGN PATENT DOCUMENTS

| DE | 102006044864 A1 | 4/2008 |
| DE | 102008032747 A1 | 1/2010 |

(Continued)

OTHER PUBLICATIONS

European Extended Search Report, Application No. EP 15183520.4, dated Apr. 28, 2016.

*Primary Examiner* — Katrina R Fujita
(74) *Attorney, Agent, or Firm* — Jones Day

(57) ABSTRACT

A system for visibility enhancement comprises a first sensor means comprising a camera adapted to record at least one image. A second sensor means is adapted to generate at least one position profile of at least one object located within a critical range of the first sensor means. An image processing means is adapted to receive a first input signal from the first sensor means containing the at least one image and a second input signal from the second sensor means containing the at least one position profile of the at least one object located within the critical range. The image processing means further manipulates the at least one image to generate a manipulated image by altering the contrast of that part of the image that shows the at least one object located within the critical range. A corresponding method of visibility enhancement is also disclosed.

14 Claims, 3 Drawing Sheets

(51) Int. Cl.

| | | |
|---|---|---|
| *H04N 5/225* | (2006.01) | |
| *G06K 9/20* | (2006.01) | |
| *B60R 1/00* | (2006.01) | |
| *B60K 35/00* | (2006.01) | |
| *G08G 1/16* | (2006.01) | |
| *B62D 15/02* | (2006.01) | |
| *G06T 7/11* | (2017.01) | |
| *G08G 1/14* | (2006.01) | |
| *G06T 7/593* | (2017.01) | |
| *G06T 7/55* | (2017.01) | |
| *G06T 7/70* | (2017.01) | |
| *G01S 13/931* | (2020.01) | |
| *B60W 50/14* | (2020.01) | |
| *G01S 13/86* | (2006.01) | |
| *B60W 30/08* | (2012.01) | |

(52) U.S. Cl.
CPC ......... *G06K 9/00805* (2013.01); *G06K 9/209* (2013.01); *G06T 7/11* (2017.01); *G06T 7/55* (2017.01); *G06T 7/593* (2017.01); *G06T 7/70* (2017.01); *G08G 1/143* (2013.01); *G08G 1/165* (2013.01); *G08G 1/166* (2013.01); *H04N 5/2252* (2013.01); *B60K 2370/152* (2019.05); *B60R 2300/301* (2013.01); *B60R 2300/307* (2013.01); *B60R 2300/8066* (2013.01); *B60W 30/08* (2013.01); *B60W 2050/146* (2013.01); *G01S 13/865* (2013.01); *G01S 13/867* (2013.01); *G01S 13/931* (2013.01); *G06T 2200/04* (2013.01); *G06T 2207/10012* (2013.01); *G06T 2207/10028* (2013.01); *G06T 2207/10048* (2013.01); *G06T 2207/20004* (2013.01); *G06T 2207/20172* (2013.01); *G06T 2207/30236* (2013.01); *G06T 2207/30261* (2013.01)

(58) Field of Classification Search
CPC ... G06T 7/11; G06T 7/55; G06T 7/593; G06T 7/70; G06T 2200/04; G06T 2207/10012; G06T 2207/10028; G06T 2207/10048; G06T 2207/20004; G06T 2207/20172; G06T 2207/30236; G06T 2207/30261; G06K 9/00805; G06K 9/209; B60W 30/08; B60W 2050/146; B62D 15/029; B60K 35/00; B60K 2370/152; G08G 1/143; G08G 1/165; G08G 1/166; G01S 13/865; G01S 13/867; G01S 13/931; G01C 11/06
See application file for complete search history.

(56) References Cited

U.S. PATENT DOCUMENTS

| | | | |
|---|---|---|---|
| 2006/0173621 A1* | 8/2006 | Stopczynski | B60W 30/09 701/301 |
| 2007/0106475 A1 | 5/2007 | Kondoh | |
| 2009/0051516 A1 | 2/2009 | Abel et al. | |
| 2009/0102858 A1 | 4/2009 | Eggers et al. | |
| 2009/0187343 A1 | 7/2009 | Koch-Groeber et al. | |
| 2010/0231716 A1* | 9/2010 | Klaerner | B60R 1/00 348/148 |
| 2010/0265048 A1* | 10/2010 | Lu | B60Q 9/005 340/435 |
| 2011/0115615 A1* | 5/2011 | Luo | H04N 13/239 340/436 |
| 2011/0181728 A1* | 7/2011 | Tieman | B60R 1/00 348/148 |
| 2012/0001742 A1* | 1/2012 | Nozoe | B60Q 9/00 340/435 |
| 2012/0062743 A1* | 3/2012 | Lynam | H04N 5/23293 348/148 |
| 2013/0093887 A1 | 4/2013 | Wu et al. | |
| 2016/0247030 A1* | 8/2016 | Matsumoto | B60R 1/00 |
| 2018/0134217 A1* | 5/2018 | Peterson | G06K 9/00805 |
| 2018/0244153 A1* | 8/2018 | Ejiri | G08G 1/167 |

FOREIGN PATENT DOCUMENTS

| | | |
|---|---|---|
| EP | 1223083 A1 | 7/2002 |
| EP | 1407931 A1 | 4/2004 |
| EP | 1642770 A2 | 4/2006 |
| EP | 1672588 A2 | 6/2006 |

* cited by examiner

SYSTEM AND METHOD FOR VISIBILITY ENHANCEMENT

CROSS-REFERENCE TO RELATED APPLICATIONS

This application claims priority from European Patent Application No. 15183520.4, filed Sep. 2, 2015, the disclosure of which is incorporated herein by reference.

BACKGROUND OF THE INVENTION

This invention relates to a system and to a method for visibility enhancement. The system comprises first and second sensor means to obtain image information and position information with regards to the surroundings of a motor vehicle, and image processing means to manipulate image information.

Modern day intelligent motor vehicle assistant systems use image data of cameras that are installed in various locations in or at the vehicle for warning the driver of hazardous situation. For example, these assistant systems can generate a cross traffic alert, or autonomously detect pedestrians. Most modern day assistant systems do not just process the image information to create an audible or optical warning, but also modify image data obtained from the various cameras that are located in or at the vehicle to include graphical warnings by adding information to the raw image data. Because, the amount of information that is presented to the driver is constantly increasing in modern day vehicles, the manner of presenting data to the driver becomes ever more important.

The assistant systems that are used for detecting objects usually include one or more cameras that are located somewhere in the front of the motor vehicle. For example, the cameras could be located behind the radiator cowling of the motor vehicle, or the cameras are placed somewhere in the bumper. For example, DE 10 2013 000 261 A1 describes the use of two cameras in the front of a vehicle that record a driving scene from different angles so that the distance of objects from the vehicle can be determined by image processing. In contrast, US 2003/0095080 describes a system for capturing a driving scene using just one camera. Here, pattern recognition techniques are used to detect the shape of certain objects such as traffic signs that appear within a certain proximity of the vehicle. The image that will be shown to the driver on a screen in the dashboard is then manipulated by highlighting the borders of the detected shapes with high visibility coloring, or by flashing borders.

Most of these prior art assistant systems, however, are highly complicated, expensive, only capture the scene in front of the car, and employ confusing highlighting schemes where in the regions of the image with no objects the noise is increased which results in unpleasant results.

Therefore, the invention aims at providing an improved visibility enhancement system that overcomes the shortcomings and drawbacks of the prior art systems and a corresponding method.

SUMMARY OF THE INVENTION

The invention provides a system for visibility enhancement. The system comprises first sensor means comprising a camera adapted to record at least one image and second sensor means adapted to generate at least one position profile of at least one object located within a critical range of the first sensor means. The system also comprises image processing means adapted to receive a first input signal from the first sensor means containing the at least one image and a second input signal from the second sensor means containing the at least one position profile of the at least one object located within the critical range. The image processing means is further adapted to manipulate the at least one image to generate a manipulated image by altering the contrast of that part of the image that shows the at least one object.

The system for visibility enhancement could be part of an already existing assistant system in a motor vehicle, or could be an independent assistant system. The system comprises first sensor means comprising a camera adapted to record at least one image. The camera could be any digital camera that is able to record at least one image. Here, the term "recording" is used to refer to capturing image information by means of the camera, wherein just one image could be recorded following a triggering event. However, more than just one image could be recorded, such as for example 20 images per second or more, so that real time image information can be presented to the driver.

The system further comprises second sensor means adapted to generate a position profile of at least one object located within a critical range of the first sensor means. Here, the term "position profile" is used to refer to movement parameters such as the distance of the at least one object from the second sensor means, and/or the speed of the at least one object relative to the second sensor means. The at least one object could be any object that is able to move relative to the first sensor means such as for example a person, an animal, another car, etc. The critical range could be, for example, a certain distance away from the first sensor means in the direction of the driving scene, where "away from the first sensor means" also means away from the second sensor means, and away from the vehicle, respectively.

Also, an image processing means is comprised within the system for visibility enhancement. For example, the image processing means could be a microprocessor that is also located in the rear view equipment. However, the microprocessor could be also located somewhere else in the vehicle. As a first input signal, the image processing means receives a signal from the first sensor means containing the at least one image. Here, the signal could be a continuous data stream that contains the information of about 20 or more images per second. The image processing means receives as a second input signal the position profile of the at least one object located within the critical range from the first sensor means. The refreshing rate of the second sensor means might correspond to the refreshing rate of the first sensor means so that in case a continuous data stream containing the information of about 20 or more images is received at the image processing means as a first input signal, the second input signal also comprises the exact number of about 20 or more corresponding position profiles of that at least one object. The determination if the object is within the critical range could be made either in the second sensor means, or in the image processing means. For example, the critical range could be a threshold value that is stored in the image processing means and which might be freely adjustable by the driver.

The image processing means is also adapted to manipulate the at least one image to generate a manipulated image by altering the contrast of that part of the image that shows the at least one object. Advantageously, the image processing means can process the first and second input signals to manipulate the at least one image recorded by the first sensor means by highlighting the at least one object that is located within the critical range. If more than one object is located in the critical range, the other objects could be highlighted in the same manner. The highlighting is done by altering the contrast of that part of the image that shows the object. Here, the term "contrast" is used to refer to a difference in color and brightness. For example, the contrast of that part of the image that shows the at least one object could be altered, so that the object appears really bright, or really dark, respectively, while the remaining part of the image, i.e. the background remains unchanged. Advantageously, by altering the contrast only on those regions which show close objects, strong noise can be avoided and at the same time the visibility of the interesting parts of the image can be increased. Also, the system for visibility enhancement as defined in the independent claims makes mirror replacement more useful as it makes objects on the road more visible than in a simple mirror replacement system.

As described above, the term "altering the contrast of that part of the image that shows the object" can be used to refer to a contrast change of the entire area of the image that shows the object, but may also alternatively or additionally refer to a contrast change of only the area around that object, for example only to the contrast of the contour line of that object. Also, the definition of "contrast" as a difference of color and brightness can include the coloring of that part of the image that shows the object with a different color when it is referred to "altering the contrast".

Also, in one example, the term "camera" can be used to refer to a sensor that is able to gather information of the surroundings, but which does not take an actual image of the surroundings. For example, the camera could be some other optical, electromagnetic, or acoustic sensor that is capable of gathering information. In that case, the manipulated image could be presented to the driver in form of a different optical indication such as by means of some icon that appears on the LCD screen. Also in addition or alternative to an optical output acoustic (warning) signals might be emitted.

In one example, the camera is installed in a rear view equipment of a motor vehicle, and/or the second sensor means is aligned with the first sensor means, and/or the image processing means is further adapted to output the manipulated image to a display means for displaying the manipulated image to the driver of the motor vehicle. The camera could be any digital camera that is able to record at least one image and which has appropriate dimensions to be installed in a rear view equipment, such as for example in a side mirror, or in an interior mirror of the motor vehicle. Here the term "installed in" is used to refer to a location inside the housing, or on the housing of the rear view equipment. Also, the camera could be a camera that is already installed in the rear view equipment such as the camera that is used for mirror replacement and/or blind spot detection and which is usually installed in one, or in both, of the side mirrors of the motor vehicle. The camera for blind spot detection essentially covers at least part of the region to the side of the vehicle and part of the backside region of the vehicle. Alternatively, the camera could be also installed in the rear view equipment in a way so that it faces into the driving direction to capture the driving scene in front of the car.

Also, the second sensor means is aligned with the first sensor means. Therefore, the second sensor means could be located in the rear view equipment as well. Alternatively, the second sensor means could be located somewhere else in or at the vehicle. Here, the term "aligned" is used to define that the first and the second sensor means essentially both face in the same direction, i.e. away from the vehicle, and towards the same driving scene.

The image processing means is further adapted to output the manipulated image to a display means for displaying the image to the driver. For example, the manipulated image could be provided at an output of the image processing means to the display means, such as for example to an LCD display or to a head up display installed in the passenger compartment of the vehicle.

In another example, altering the contrast of that part of the image that shows the at least one object comprises increasing the contrast. Advantageously, by increasing the contrast of that part of the image that shows the at least one object increases the visibility of the at least one object that is displayed to the driver by means of the display means.

In yet another example, the image processing means is further adapted to manipulate the at least one image to generate a manipulated image by altering the contrast of that part of the image that does not show the at least one object. For example, the contrast of that part of the image that does not show the at least one object can be decreased so that the attention of the driver is drawn away from the surroundings of that at least one object. However, alternatively, depending on the size of that at least one object, for example, in case the at least one object is very small compared to its surroundings, the contrast of the part of the image that does not show the at least one object can be increased while the contrast of the object is decreased. Advantageously, by using the later scheme, the presence of a very small object can be better indicated to the driver.

In another example, the second sensor means comprises at least one optical, electromagnetic, and/or acoustic sensor, especially in form of a least one infrared sensor, and/or at least one laser sensor, and/or at least one radar sensor, and/or at least one ultraviolet, UV, sensor. Depending on the sensors that are already installed in the rear view equipment, or in some other locations of the motor vehicle, the second sensor means could comprise any, or just one of the above mentioned sensors.

In another example, the second sensor means comprises at least two sensors. Especially, when less sophisticated sensors, like for example IR sensors are employed as second sensor means, two sensors can be used to generate the at least one position profile of the at least one object. Also, two different kinds of sensors, for example one infrared and one laser sensor can be used in parallel to increase the accuracy of the second sensor means.

In another example, the position profile of the object located within the critical range of the first sensor means is determined by a triangulation technique. By using that technique, the at least one position profile can be generated by measuring two angles to the at least one object by means of the two sensors that are installed on known locations, or points, on either end of a fixed baseline. The fixed base line could be, for example, an edge of the rear view equipment. The at least one object can then be determined as the third point of a triangle with one known side and two known angles. The triangulation can be repeated every time the first sensors means is recording a new image so that corresponding position profile data is generated for each image, where the speed of the at least one object can be deduced by the difference in location of the at least one object in subsequent measurements.

In yet another example, the second sensor means is moved mechanically for alignment with the first sensor means.

Depending on the sensor type, the beamwidth of the sensor(s) used, and thus the detectable area, might be smaller than the field of view of the camera that is comprised in the first sensor means. In that case the sensor(s) that is used as second sensor means can be mechanically moved, or rotated along a section of a circle that describes the field of view of the camera so that all objects that are located within the field of view of the camera can be located by the second sensor means. The translational and/or rotational motion can be, for example, provided by an electrical motor.

In another example, the second sensor means is moved electrically for alignment with the first sensor means. Electrical steering can be done, for example, by employing a sensor array, where a phase shift between the array elements can be introduced in the horizontal direction as well as in the vertical direction so that the beam can be steered in all directions to cover the entire field of view of the camera. Advantageously, by using electrical steering means, no mechanical components are needed. Therefore, electrically steering is more reliable and also faster than moving the second sensor means mechanically.

In yet another example, the camera is sensitive to a night spectrum at a wavelength between 700 and 1100 nm. Advantageously, by using a camera that works in the near infrared region, the system can be also used at night where the surroundings of the vehicle are just dimly lit.

In another example, the critical range is defined by a perimeter of a street on which the vehicle is driving on, and/or by a certain distance from the motor vehicle. For example, the critical area could be a section of the street in the field of view of the first sensor means, or the critical range might be just one lane of that street. In the latter case only objects on this lane fall within the critical range, whereas objects that are not located on that lane don't fall into the critical range. The determination of what objects are located inside and what objects are located outside the critical range could be made, for example, by image detection techniques. Alternatively, or additionally the critical range can also be defined as a predetermined distance from the motor vehicle. For example, the critical range could be a distance of 1 to 20 meters from the motor vehicle and/or from the first and second sensor means.

In another example, the camera is arranged to record at least 20 images per second. Advantageously, by recording several images per second as well as generating the corresponding position profile of the at least one object located in the critical range, real-time information can be fed to the image processing means. By using a contemporary microprocessor that is able to evaluate more than 20 images per second, visibility enhancement can be done in real-time.

The method of image visibility enhancement according to the invention comprises the steps of recording at least one image; generating at least one position profile of an object located within a critical range of the image; and manipulating the at least one image to generate at least one manipulated image by altering the contrast of that part of the image that shows the object.

In one example of the method, altering the contrast comprises increasing the contrast of the at least one object.

Also, according to the invention a computer program product is described comprising a computer readable medium having instructions stored thereon for causing a computer to perform the method steps as described above.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
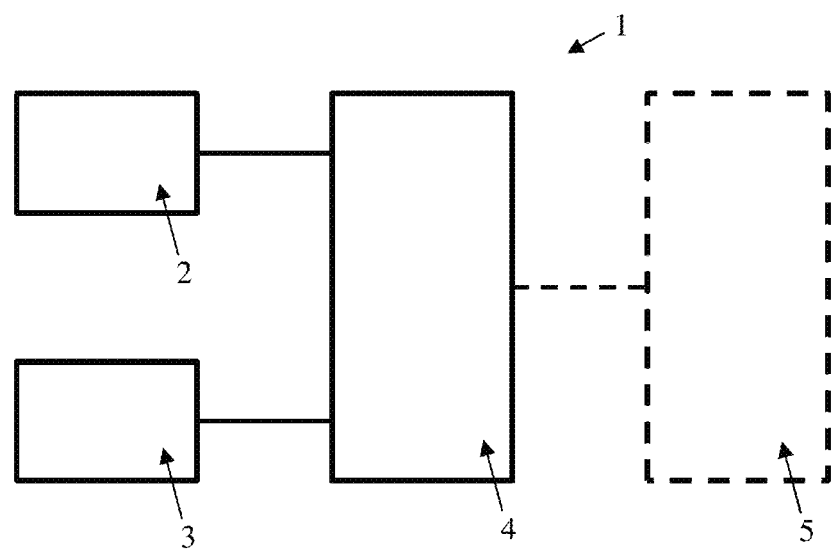
FIG. 1 is a schematic view of a system for visibility enhancement according to the invention.

Referring now to the drawings, there is illustrated in FIG. 1 a system 1 for visibility enhancement according to an embodiment of the invention. The system 1 comprises first sensor means 2 that comprises a camera, second sensor means 3 and image processing means 4.

The camera comprised within the first sensor means 2 could be a digital camera that is installed on or in the housing of a rear view equipment of a motor vehicle. The second sensor means 3 could be at least one infrared sensor, laser sensor, and/or radar sensor. However, the skilled person would know that the second sensor means 3 could be also composed of more than one, and/or of different sensors. The second sensor means 3 has essentially the job of detecting areas in the image that have objects closer than a certain distance using state of the art object detection techniques.

In the example that is shown in FIG. 1, both sensor means 2 and 3 are shown as separate entities. However, the skilled person would know that both sensor means 2 and 3 could be located in the same housing, e.g. the second sensor means 2 could be located in the housing of the rear view equipment as well.

The first and second sensor means 2, 3 are both connected to the image processing means 4, either via a wire link, such as for example via the vehicles CAN Bus system, or wireless via Bluetooth, or by any other appropriate wireless standard. The image processing means 4 manipulates the at least one image that was recorded by the camera to generate a manipulated image by altering the contrast of that part of the image that shows the at least one object located within the critical range.

In the example that is shown in FIG. 1 the image processing means 4 outputs the manipulated image to a display means 5 which is depicted in FIG. 1 by dashed lines. The display means 5 does not need to be a part of the system 1 for visibility enhancement. However, the skilled person would know that the manipulated image could be also outputted to a different means, such as for example to a mobile device.

Figure 2A:
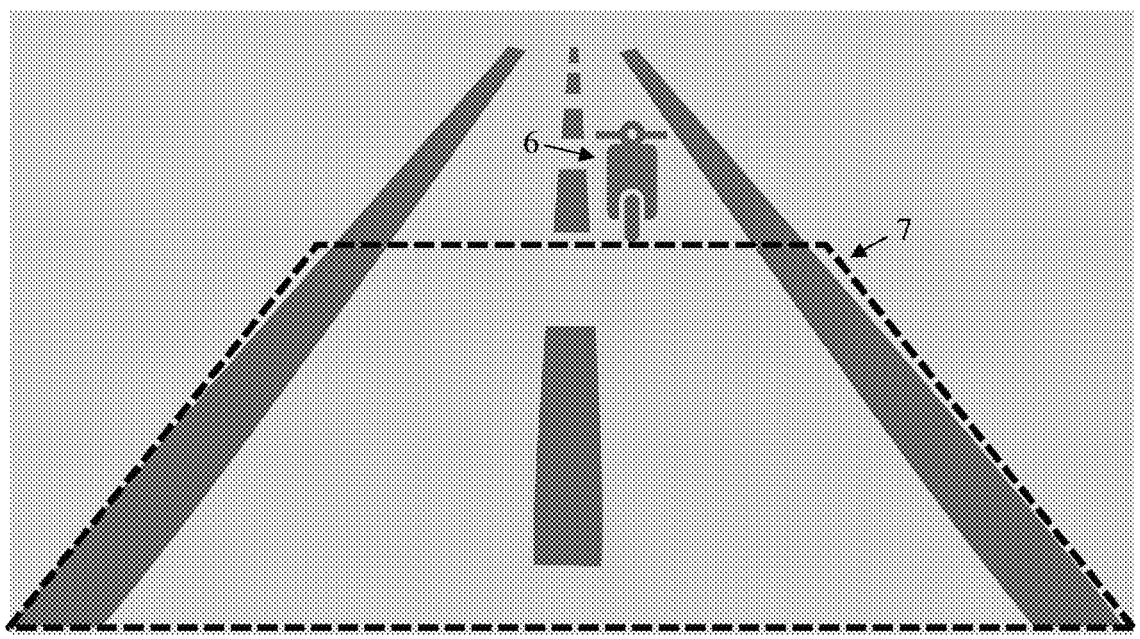
FIG. 2*a* is a schematic illustration of an image where the at least one object is located outside a critical range of a first sensor means.

The images shown in FIGS. 2*a,b,c* are example images that show the basic principle of visibility enhancement in one specific example when the first and second means 2, 3 are arranged to essentially face the driving scene either in front or behind the driving direction of the motor vehicle. However, the skilled person would understand that if the camera is, for example, also used for blind spot detection, the image would show the street from a different perspective where for example also sections of the street on the left and right side of the vehicle would appear in the image.

In FIG. 2a an example of an image is shown where the at least one object 6 is located outside a critical range of the first sensor means 2. In the example, the object is depicted as a motor cycle. However, the object could be any object that enters the critical range 7, such as for example, a person or an animal. Because, the at least one object 6 is located outside the critical range 7, the contrast of that part of the image that shows the at least one object 6 is not altered. In the here shown example, the critical range 7 is marked with a dashed line as a section of the street where the motor vehicle is located on. In FIG. 2a, all objects would fall into the critical range 7 that come within a distance of a few meters to the vehicle, and/or to the first and second sensor means 2, 3. However, the skilled person would know that the critical range could be a range that extents up to 50 meters away from the vehicle, depending on the capabilities of the first and second sensor means 2, 3. Also, the critical range 7 could cover just a segment of the street such as covering one specific lane.

Figure 2B:
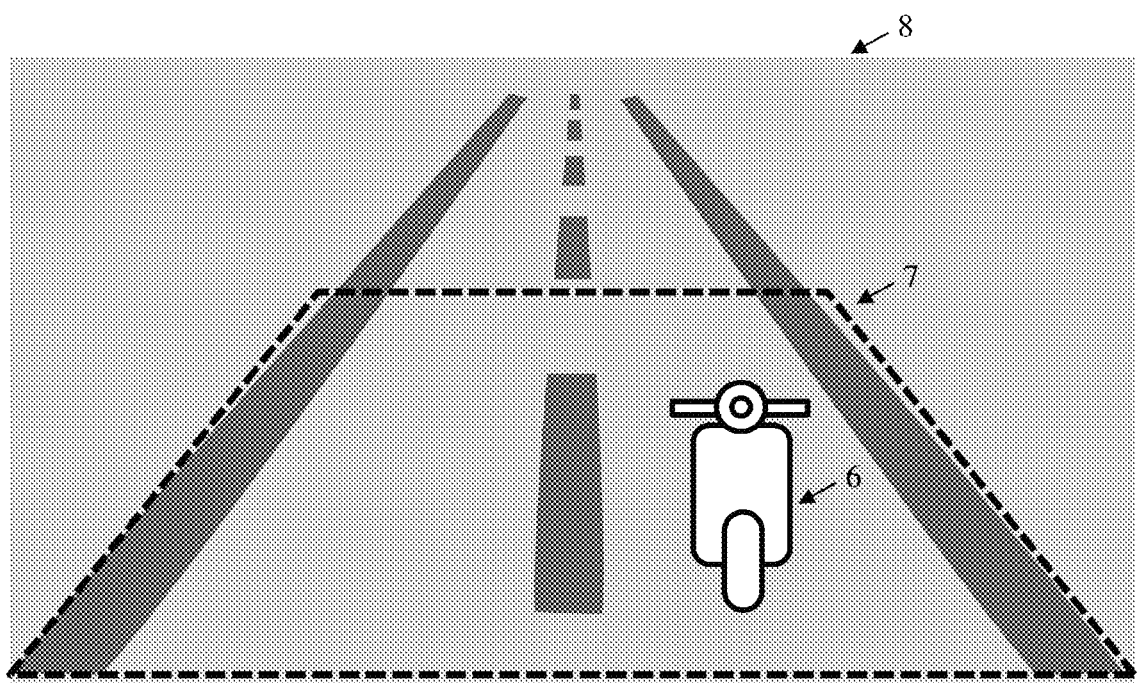
FIG. 2*b* is a schematic illustration of a manipulated image where at least one object is located within a critical range of the first sensor means, and where the contrast of a portion of the image that shows the at least one object is increased.

In FIG. 2b an example of a manipulated image 8 is shown where the at least one object 6 is located within the critical range 7, and where the contrast of that part of the image that shows the at least one object 6 is increased. As it can be seen, the visibility of the object 6 can be greatly increased in a correspondingly manipulated image 8 so that the approaching object 6 attracts the driver's attention.

Figure 2C:
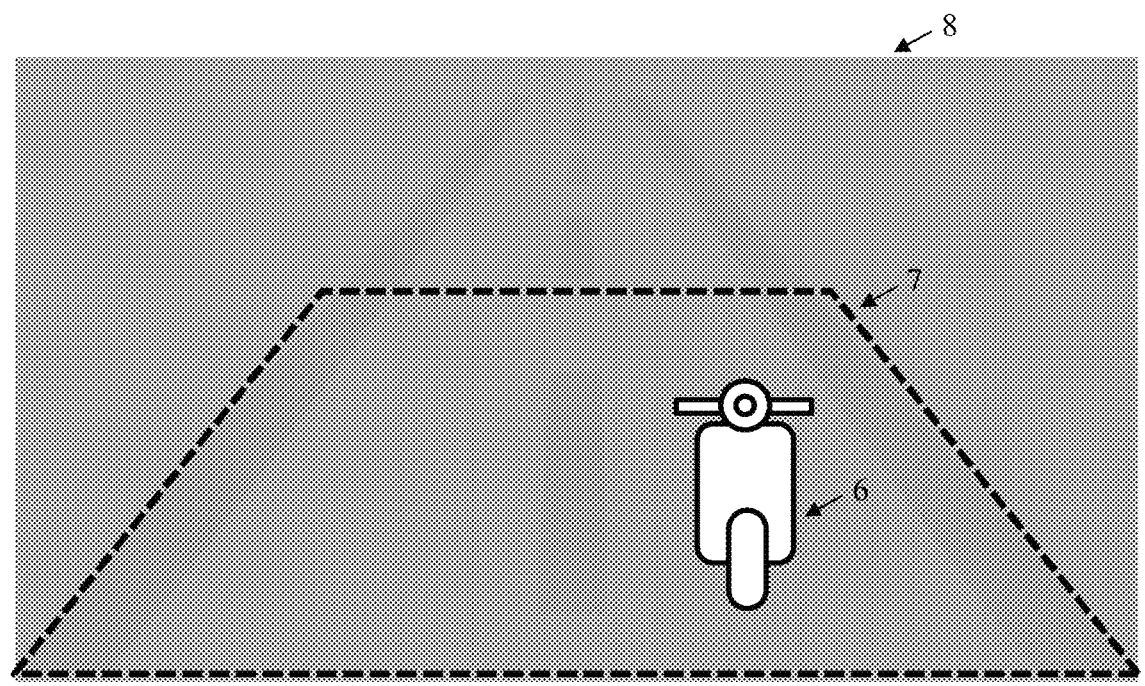
FIG. 2*c* is a schematic illustration of the manipulated image where the at least one object is located within a critical range of the first sensor means, and where the contrast of that part of the image that shows the at least one object is increased, while the contrast of that part of the image that does not show the at least one object is decreased.

FIG. 2c shows an example of a manipulated image 8 where the at least one object 6 is located within the critical range 7 of the first sensor means 2, and where the contrast of that part of the image that shows the at least one object 6 is increased, while the contrast of that part of the image that does not show the at least one object 6 is decreased. As it can be seen from the image, the visibility of the object 6 can be even further increased by decreasing the contrast of those parts of the manipulated image 8 that do not show the at least one object.

Figure 3:
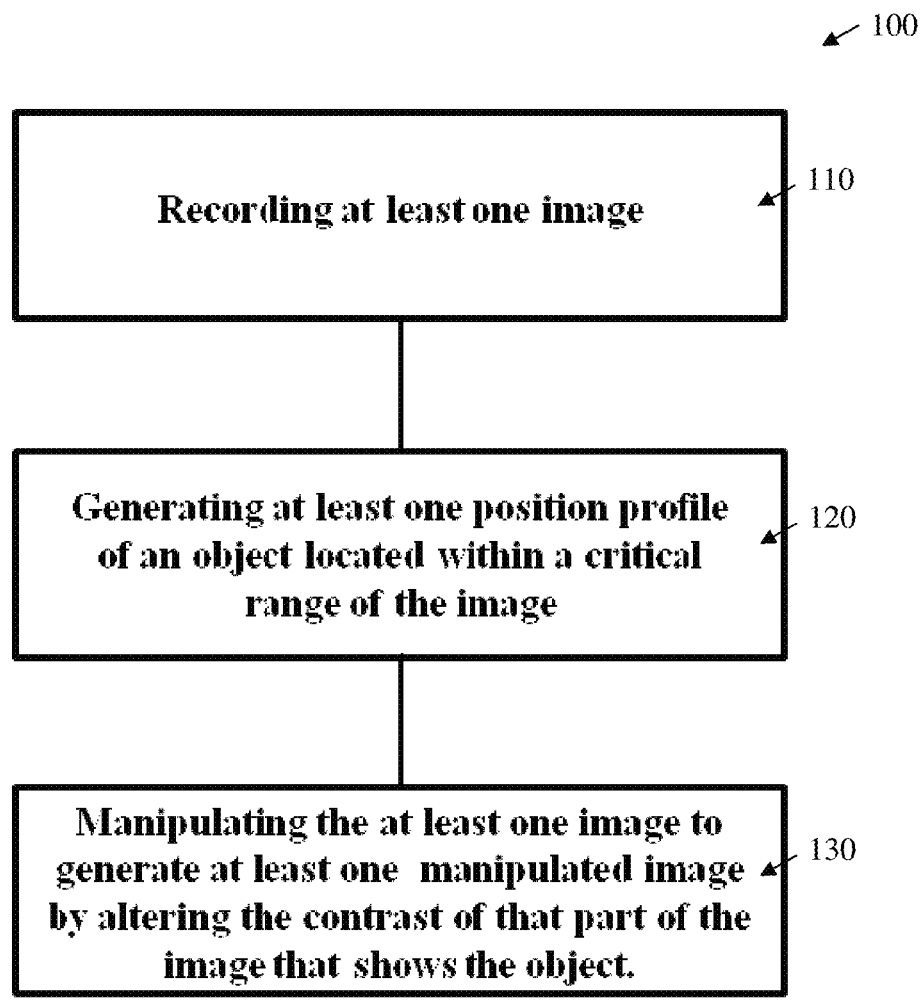
FIG. 3 is a flow chart of method steps of a method for image visibility enhancement.

In FIG. 3 the method steps of a method 100 for image visibility enhancement are shown. The method comprises the steps of recording 110 at least one image; generating 120 at least one position profile of an object 6 located within a critical range 7 of the image; and manipulating 130 the at least one image to generate at least one manipulated image 8 by altering the contrast of that part of the image that shows the object 6.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A system for visibility enhancement for a motor vehicle assistant system for warning a driver of hazardous situations, comprising:
a first sensor means comprising a camera installed in a rear view equipment of the motor vehicle adapted to record at least one image;
a second sensor means adapted to generate at least one position profile of at least one object located within a critical range of the first sensor means where the critical range is determined by a critical distance that is a predetermined distance from the motor vehicle, and the first and the second sensor means are arranged to face a driving scheme behind a driving direction of the motor vehicle; and
an image processing means adapted to:
receive a first input signal from the first sensor means containing the at least one image and a second input signal from the second sensor means containing the at least one position profile of the at least one object located within the critical range, and
manipulate the at least one image to generate a manipulated image by
altering the contrast of that part of the image that shows the at least one object located within the critical range, wherein altering the contrast of that part of the image that shows the at least one object located within the critical range comprises increasing the contrast of the entire area of the image that shows the at least one object, and
altering the contrast of that part of the image that does not show the at least one object located within the critical range, wherein altering the contrast of that part of the image that does not show the at least one object located within the critical range comprises decreasing the contrast of the entire area of the image that does not show the at least one object,
wherein the second sensor means detects the at least one object within the critical range and detects one or more other objects outside the critical range, and the manipulating of the at least one image comprises electing to alter a contrast of that part of the image that shows the one or more other objects outside the critical range.

2. The system for visibility enhancement of claim 1, wherein the camera is installed in a rear view equipment of a motor vehicle, and/or wherein the second sensor means is aligned with the first sensor means and/or wherein the image processing means is further adapted to output the manipulated image to a display means for displaying the manipulated image to the driver of the motor vehicle.

3. The system for visibility enhancement of claim 2, wherein the second sensor means is moved mechanically for alignment with the first sensor means.

4. The system for visibility enhancement of claim 2, wherein the second sensor means is moved electrically for alignment with the first sensor means.

5. The system for visibility enhancement of claim 1, wherein the image processing means is further adapted to manipulate the at least one image to generate a manipulated image by altering the contrast of that part of the image that does not show the at least one object located within the critical range.

6. The system for visibility enhancement claim 1, wherein the second sensor means comprises at least one optical, electromagnetic, and/or acoustic sensor, especially in form of a least one infrared sensor, and/or at least one laser sensor, and/or at least one radar sensor, and/or at least one ultraviolet, UV, sensor.

7. The system for visibility enhancement of claim 1, wherein the second sensor means comprises at least two sensors.

8. The system for visibility enhancement of claim 7, wherein the position profile of the at least one object located within the critical range of the first sensor means is determined by a triangulation technique.

9. The system for visibility enhancement of claim 1, wherein the camera is sensitive to a night spectrum at a wavelength between 700 and 1100 nm.

10. The system for visibility enhancement of claim 1, wherein the critical range is defined by a perimeter of a street the motor vehicle is driving on, and/or by a certain distance from the motor vehicle.

11. The system for visibility enhancement of claim 1, wherein the camera is arranged to record at least 20 images per second.

12. A method of image visibility enhancement for a motor vehicle assistant system for warning a driver of a hazardous situation, the method comprising:
   recording at least one image using a first sensor comprising a camera installed in a rear view device of the motor vehicle;
   generating at least one position profile of at least one object located within a critical range of the image using a second sensor, the critical range being of the first sensor means and determined by a critical distance that is a predetermined distance from the motor vehicle, and the first and the second sensor means being arranged to face a driving scheme behind a driving direction of the motor vehicle; and
   manipulating the at least one image to generate at least one manipulated image by
      altering a contrast of a part of the image that shows the at least one object, wherein the altering of the contrast of the part of the image that show the at least one object comprises increasing the contrast of the entire area of the image that shows the at least one object, and
      altering a contrast of a part of the image that does not show the at least one object located within the critical range, wherein the altering of the contrast of the part of the image that does not show the at least one object comprises decreasing the contrast of the entire area of the image that does not show the at least one object,
   wherein the second sensor means detects the at least one object within the critical range and detects one or more other objects outside the critical range, and the manipulating of the at least one image comprises electing to alter a contrast of that part of the image that shows the one or more other objects outside the critical range.

13. The method of image visibility enhancement of claim 12, wherein altering the contrast comprises increasing the contrast of the at least one object.

14. A computer program product comprising a non-transitory computer readable medium having instructions stored thereon for causing a computer to perform a method according to claim 12.

* * * * *